United States Patent
Hansen et al.

(10) Patent No.: US 12,059,829 B2
(45) Date of Patent: Aug. 13, 2024

(54) COMBINED INJECTION MOULDING AND EXTRUSION

(71) Applicant: FLEX LTD., Singapore (SG)

(72) Inventors: Jan Hansen, Sønderborg (DK); Rasmus Andersen, Sydals (DK)

(73) Assignee: FLEX LTD., Singapore (SG)

( * ) Notice: Subject to any disclaimer, the term of this patent is extended or adjusted under 35 U.S.C. 154(b) by 146 days.

(21) Appl. No.: 16/807,395

(22) Filed: Mar. 3, 2020

(65) Prior Publication Data

US 2020/0282610 A1 Sep. 10, 2020

Related U.S. Application Data

(60) Provisional application No. 62/814,084, filed on Mar. 5, 2019.

(51) Int. Cl.

| | | |
|---|---|---|
| *B29C 45/00* | (2006.01) | |
| *B29C 45/26* | (2006.01) | |
| *B29C 45/73* | (2006.01) | |
| *B29C 48/00* | (2019.01) | |
| *B29C 48/02* | (2019.01) | |
| *B29C 48/25* | (2019.01) | |
| *B29C 33/00* | (2006.01) | |
| *B29C 33/76* | (2006.01) | |

(52) U.S. Cl.
CPC ...... *B29C 45/0055* (2013.01); *B29C 45/2616* (2013.01); *B29C 45/73* (2013.01); *B29C 48/001* (2019.02); *B29C 48/02* (2019.02); *B29C 48/266* (2019.02); *B29C 33/0077* (2013.01); *B29C 33/76* (2013.01); *B29C 2045/0094* (2013.01); *B29C 2791/002* (2013.01)

(58) Field of Classification Search
CPC ... B29C 45/005; B29C 45/2616; B29C 45/73; B29C 48/266; B29C 45/56; B29C 69/02; B29C 33/0077; B29L 2031/7542
See application file for complete search history.

(56) References Cited

U.S. PATENT DOCUMENTS

| | | | | |
|---|---|---|---|---|
| 2,443,053 | A * | 6/1948 | Parmelee | B29C 45/56 264/DIG. 41 |
| 3,425,092 | A * | 2/1969 | Taga | B29C 45/04 264/573 |
| 10,011,049 | B1 * | 7/2018 | Johnston, VII | B29B 7/726 |
| 2004/0170717 | A1 * | 9/2004 | Satoh | B29C 45/1459 425/116 |

(Continued)

*Primary Examiner* — Emmanuel S Luk
*Assistant Examiner* — Debjani Roy
(74) *Attorney, Agent, or Firm* — Volpe Koenig

(57) ABSTRACT

A method that combines injection molding and extrusion is disclosed. First, a molten material is injected into a mold via an injection gate, the mold comprising a first portion and a second portion. Next, additional molten material is injected via the injection gate and pushed through an extrusion die located in the first portion of the mold and the second portion is separated from the first portion. In embodiments, the second portion is separated from the first portion before the additional material is injected. In other embodiments, the second portion is separated from the first portion simultaneously with the additional material being injected. The method may be used to produce longer and thinner parts with detailed features, such as catheters.

16 Claims, 5 Drawing Sheets

(56) References Cited

U.S. PATENT DOCUMENTS

| | | | |
|---|---|---|---|
| 2006/0051451 A1* | 3/2006 | Hutchinson | B29C 33/046 |
| | | | 425/552 |
| 2009/0304843 A1* | 12/2009 | Steiner | B29C 45/0003 |
| | | | 425/595 |
| 2009/0315218 A1* | 12/2009 | Izumo | B29C 45/2616 |
| | | | 264/328.12 |
| 2010/0025869 A1* | 2/2010 | Suzuishi | B29C 45/0025 |
| | | | 264/1.1 |
| 2010/0219564 A1* | 9/2010 | Ohmi | B29C 45/0001 |
| | | | 264/488 |
| 2015/0018804 A1 | 1/2015 | Rolsted | |
| 2015/0025508 A1 | 1/2015 | Rolsted | |
| 2015/0051587 A1 | 2/2015 | Rolsted et al. | |
| 2018/0194051 A1* | 7/2018 | Suzuki | B29C 45/03 |

\* cited by examiner

COMBINED INJECTION MOULDING AND EXTRUSION

CROSS REFERENCE TO RELATED APPLICATION

This application claims the benefit of U.S. Provisional Application No. 62/814,084 having a filing date of Mar. 5, 2019, which is incorporated by reference as if fully set forth.

FIELD OF INVENTION

The present application relates generally to an injection molding process. More particularly, the invention relates to a process that combines injection molding with extrusion for producing longer and thinner parts.

BACKGROUND

A catheter is a thin, flexible tube that may be inserted through a narrow opening into a body cavity to remove fluid, or facilitate performing other medical procedures. Injection molding is a process for producing parts comprising injecting a hot plastic material into a mold. Typically, there is a natural maximum fill length that can be achieved with injection molding due pressure drop within the cavity. As such, long and thin plastic parts, such as catheters, generally cannot be manufactured by injection molding. However, injection molding is a fast and efficient way to consistently produce parts with detailed features. As such, it would be desirable to have an injection molding process for producing longer and thinner parts.

SUMMARY

A method in accordance with the present disclosure combines injection molding and extrusion. First, a molten material is injected into a mold via an injection gate, the mold comprising a first portion and a second portion. Next, additional molten material is injected via the injection gate and pushed through an extrusion die located in the first portion of the mold, and the second portion is separated from the first portion. In embodiments, the second portion is separated from the first portion before the additional material is injected. In other embodiments, the second portion is separated from the first portion simultaneously with the additional material being injected. The method may be used to efficiently produce longer and thinner parts with detailed features, such as catheters.

DETAILED DESCRIPTION OF THE PREFERRED EMBODIMENTS

Examples of manufacturing methods for longer and thinner parts, such as catheters, will be described more fully herein with reference to the accompanying drawings. These examples are not mutually exclusive, and features found in one example can be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

Injection molding is a process for manufacturing parts comprising injecting a molten material into a mold. In general, a material such as plastic is fed into a heated barrel, liquefied, mixed and forced into a mold cavity where it is cooled and hardened. Injection molding is a fast and efficient way to make parts with detailed features and complex geometry.

Extrusion is a process used to create objects of a fixed cross-sectional profile. Typically, a material is pushed through an extrusion die of a desired cross-section. Hot extrusion is a process in which the extrusion is performed above the material's recrystallization temperature to keep the material from hardening and to make it easier to push the material through the die. Advantages of extrusion include the ability to create complex cross-sections and to work with materials that are brittle, since the material encounters only compressive and shear stresses. Further, parts made via extrusion have relatively good surface finish.

Figure 1:
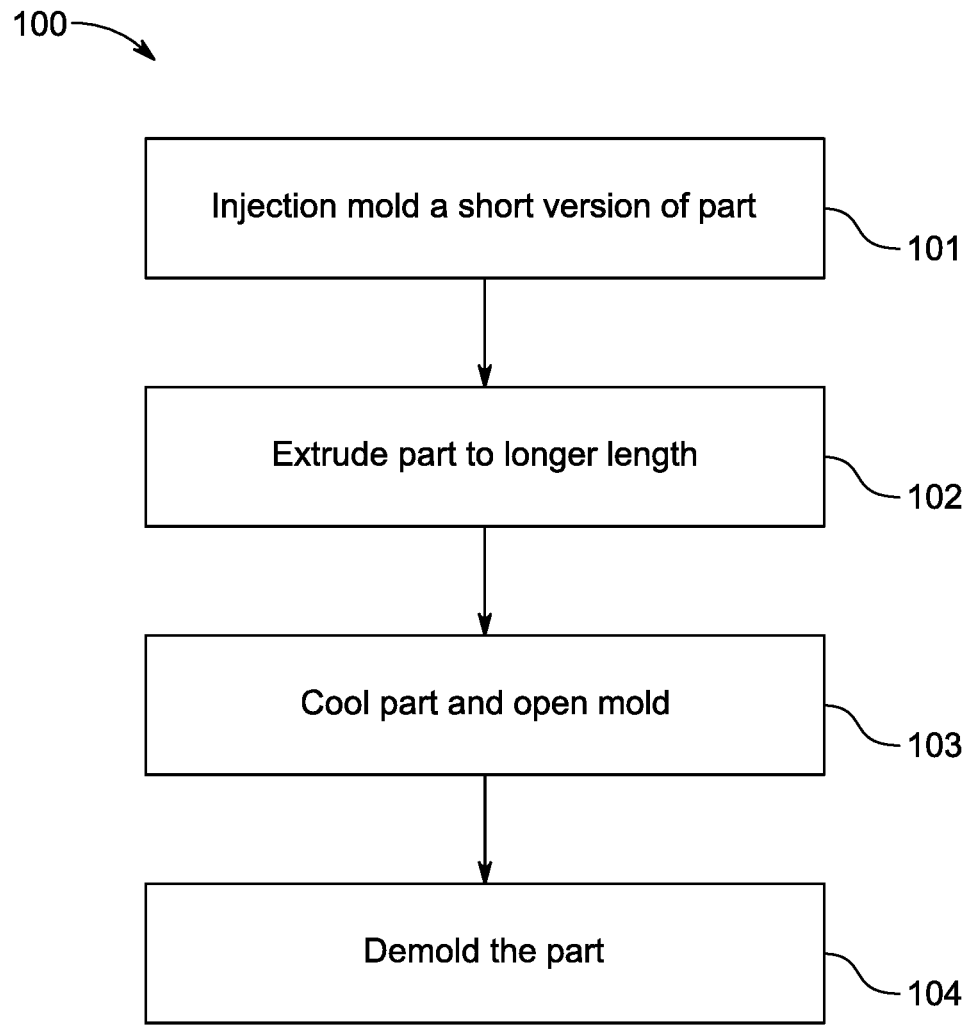
FIG. 1 is a flowchart illustrating an injection molding process in accordance with the present disclosure.

FIG. 1 is a flowchart illustrating a method 100 for manufacturing a part via injection molding and extrusion in accordance with the present disclosure. The method may be used to manufacture longer and thinner parts such as catheters. At step 101, a shorter version of the part is produced via injection molding. At step 102, the shorter version of the part is extruded to a longer length. At step 103, the part is cooled and the mold is opened. At step 104, the part is demolded. Steps 101-104 will be explained in more detail below.

Figure 2:
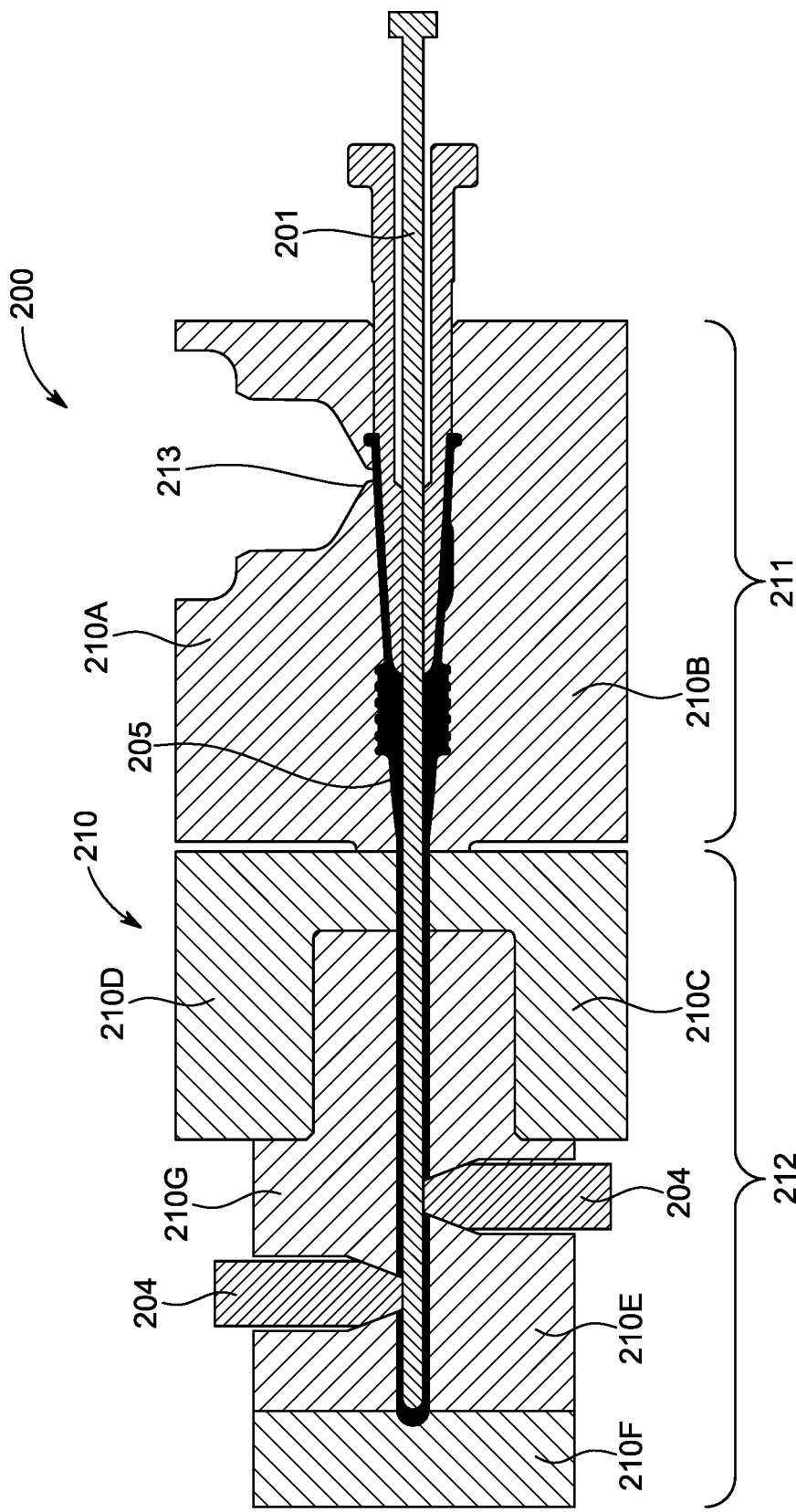
FIG. 2 is an illustration of a mold assembly at method step 101 of FIG. 1.

FIG. 2 is an illustration of the mold assembly 200 at method step 101, the injection molding step. The mold assembly 200 comprises an inner core 201 and a mold 210. A mold cavity 205 is defined by the mold 210 and the inner core 201.

The mold 210 may be configured to produce detailed features of the part. For example, the mold assembly 200 illustrated in FIGS. 2-5 comprises structures 204 configured to create two holes at one end of the part.

During step 101, a material is injected into the mold cavity 205 of the mold 210 via injection gate 213. The mold cavity 205 is sized to produce a "shorter" version of the part. In essence, this is a part having a length at the beginning of the process, that is shorter than the same part at the end of the process. When the material is injected into the mold cavity 205, the material is in a molten state. In embodiments, the material used is plastic, but this is for illustrative purposes and the same process may be utilized with other materials in accordance with the teachings herein.

The mold 210 may be comprised of a plurality of distinctive components configured to be coupled together to ultimately for a part having a desired configuration. In the drawings, the mold 210 comprises components 210A-210G. The number and configuration of the components shown in FIGS. 2-5 are an example, and many different numbers and configurations of components are possible. In embodiments, one of the components comprises the injection gate 213 for injecting the molten material. For example, in the drawings, component 210A comprises injection gate 213.

In embodiments, the component comprising the injection gate 213 and one or more components adjacent to the injection gate 213 are maintained at a high temperature during injection molding and extrusion. The components may be maintained at a high temperature through various mechanisms, such as a heater. For example, in the embodiment illustrated in FIG. 2, component 210A, which comprises the injection gate 213, and component 210B, which is adjacent to the injection gate 213, are maintained at a high temperature. The temperature at which the components are maintained may depend on the material used.

Figure 3:
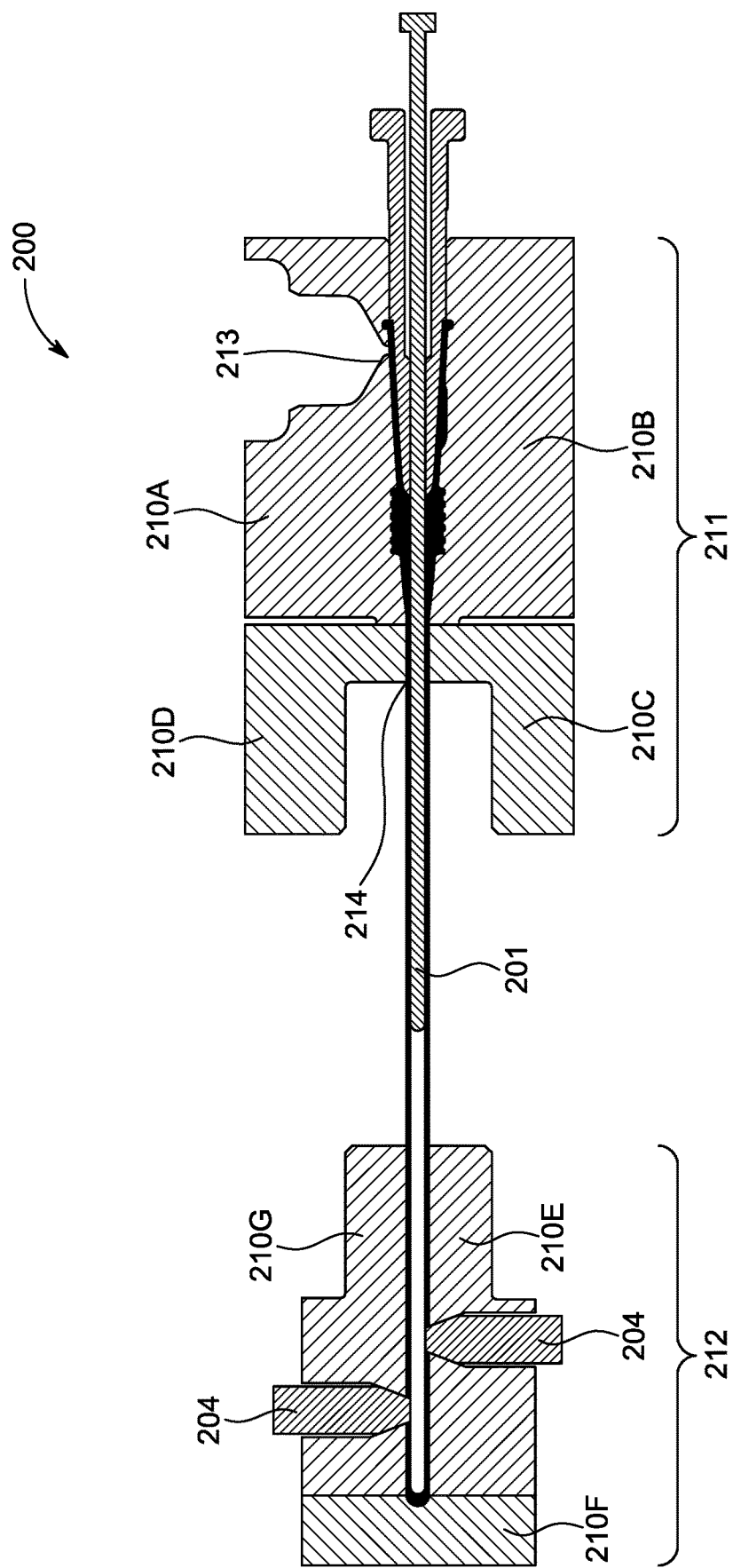
FIG. 3 is an illustration of the mold assembly at method step 102 of FIG. 1.

FIG. 3 is an illustration of the mold assembly 200 at method step 102, the extrusion step. The mold 210 comprises an extrusion die 214 with a desired cross-section. The extrusion die 214 may be formed by one or more of the components of the mold 210. The cross-section of the extrusion die 214 may be circular, oval, rectangular, or any shape compatible with the exterior and interior geometry of the mold 210.

At step 102, additional material is injected via injection gate 213 and is pushed through the extrusion die 214. Also during step 102, a first portion 211 of the mold 210 stays in place and a second portion 212 of the mold 210 moves away from the first portion 211. In embodiments, the second portion 212 separates from the first portion 211 prior to the additional material being injected. In other embodiments, the second portion 212 separates from the first portion 211 while the additional material is being injected.

In embodiments, the first portion 211 of the mold 210 comprises the injection gate 213. In alternate embodiments, the second portion 212 comprises the injection gate 213. In the embodiment illustrated in FIG. 3, components 210A-210D comprise the first portion 211 of the mold 210 and components 210E-210G comprise the second portion 212 of the mold 210.

In embodiments, the first portion 211 and the second portion 212 are aligned vertically and the second portion 212 moves along a vertical plane during step 102. In alternate embodiments, the first portion 211 and the second portion 212 are aligned horizontally and the second portion 212 moves along a horizontal plane during step 102. In further embodiments, one or more supports are provided to support the extruded part as it cools.

In embodiments, the inner core 201 moves with the second portion 212 during method step 102. In other embodiments, one end of the inner core 201 is aligned with the extrusion die 214 before method step 102. In yet other embodiments, one end of the inner core 201 is positioned between the extrusion die 214 and the position of the inner core 201 during injection molding before method step 102. In yet other embodiments, the inner core 201 stays in place during method step 102, as illustrated in FIG. 3.

Figure 4:
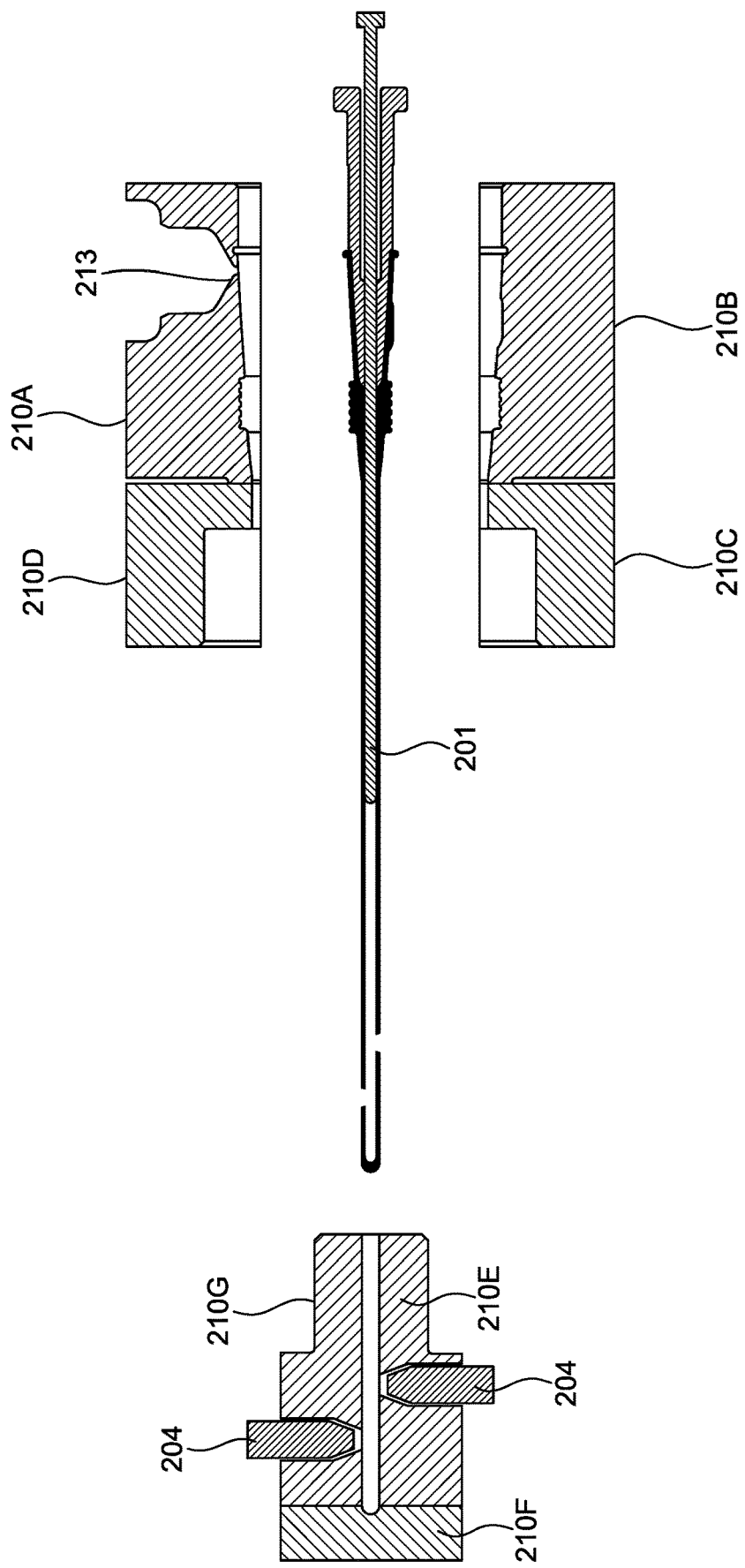
FIG. 4 is an illustration of the mold assembly at method step 103 of FIG. 1.

FIG. 4 is an illustration of the mold assembly 200 at method step 103 of FIG. 1. At step 103, the components that were maintained at a high temperature during method steps 101 and 102 are cooled. In the embodiment illustrated in the drawings, components 210A and 210B are maintained at a high temperature during method steps 101 and 102, and are subsequently cooled down during method step 103. Once the mold 210 has cooled and the part is solid, the part is removed from the mold 210 by disassembling the mold 210.

Figure 5:
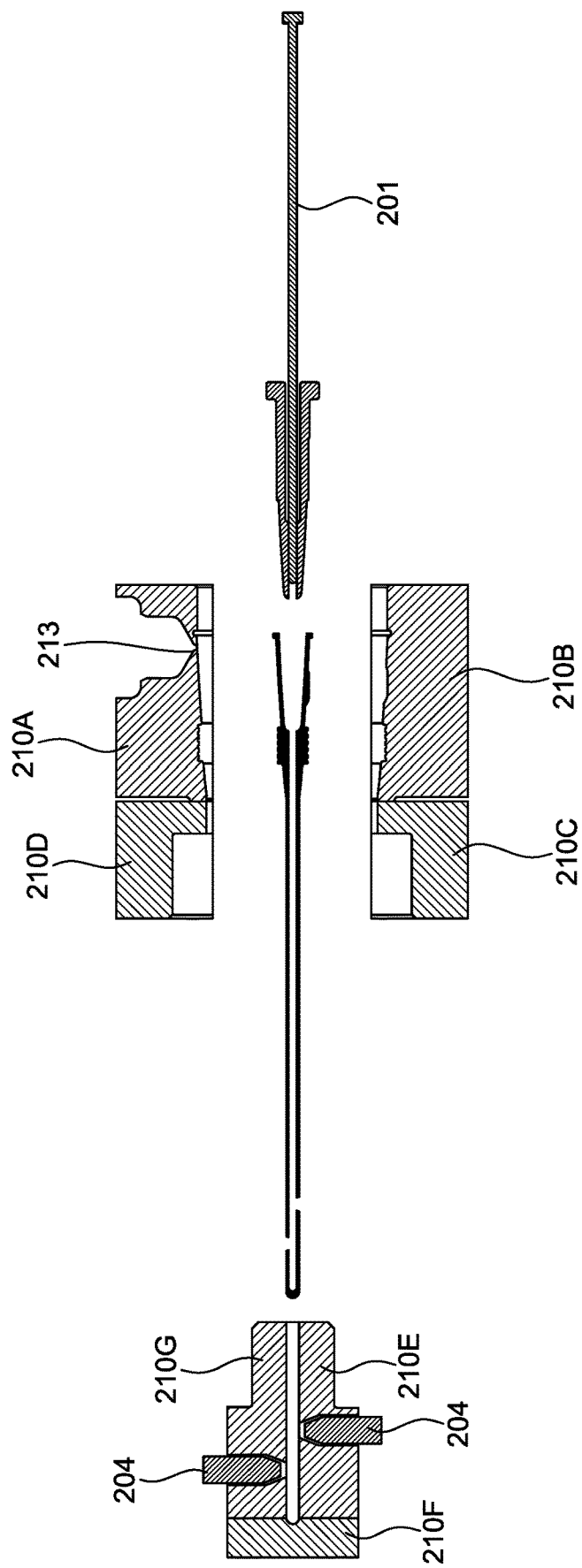
FIG. 5 is an illustration of the mold assembly at method step 104 of FIG. 1.

FIG. 5 is an illustration of the mold assembly 200 at method step 104 of FIG. 1. During method step 104, the inner core 201 is removed from the solid p art.

Although features and elements are described above in particular combinations, one of ordinary skill in the art will appreciate that each feature or element can be used alone or in any combination with the other features and elements.

What is claimed is:

1. A method for manufacturing a part, the method comprising:
    performing an injection molding, the injection molding comprising injecting a molten material into a mold at an injection gate into a tapered cavity, the mold comprising a first portion, a second portion, and an inner core, and the first portion includes at least a first component and a second component at an opposite end of the second portion,
        wherein the tapered cavity is wider in the first portion than the second portion,
        wherein during the injection molding, the inner core extends from outside the first portion, through the first portion and into the second portion, and
        wherein after the injection molding, the part is produced in a first length;
    performing an extrusion after the injection molding on the part to lengthen the part to a second length, the extrusion comprising injecting additional molten material at the injection gate, pushing the additional molten material through an extrusion die located within the first portion of the mold, moving the second portion away from the first portion, while the first portion remains in a fixed location;
    cooling the first component and the second component; and
    disassembling the mold by separating the first portion, the second portion, and the inner core from each other.

2. The method of claim 1, wherein the second portion of the mold is moved from the first portion of the mold before the additional material is injected.

3. The method of claim 1, wherein the second portion of the mold is moved from the first portion of the mold while the additional material is being injected.

4. The method of claim 1, wherein the first portion and the second portion are aligned vertically and the second portion moves along a vertical plane.

5. The method of claim 1, wherein the first portion and the second portion are aligned horizontally and the second portion moves along a horizontal plane.

6. The method of claim 1, wherein one or more supports are provided to support the part during cooling.

7. The method of claim 1, wherein disassembling the mold occurs after the material has cooled.

8. The method of claim 1, wherein the first portion of the mold comprises the injection gate.

9. The method of claim 1, further comprising inserting the inner core into the mold prior to performing the injection molding.

10. The method of claim 9, further comprising moving the inner core with the second portion while performing the extrusion.

11. The method of claim 9, wherein the inner core stays in place while performing the extrusion.

12. The method of claim 9, further comprising aligning one end of the inner core with the extrusion die before performing the extrusion.

13. The method of claim 1, wherein the mold comprises a plurality of components including first component and the second component.

14. The method of claim 13, wherein one component of the plurality of the components comprises the injection gate.

15. The method of claim 14, further comprising maintaining the one component comprising the injection gate and one or more components adjacent to the injection gate at a high temperature while performing the injection molding and the extrusion.

16. The method of claim 15, further comprising cooling the component comprising the injection gate and one or more components adjacent to the injection gate after performing the injection molding and the extrusion.

\* \* \* \* \*